June 28, 1932. R. JOKSCH 1,864,831
WEIGHING APPARATUS WITH A LOAD BALANCING LEVER
Filed April 23, 1928
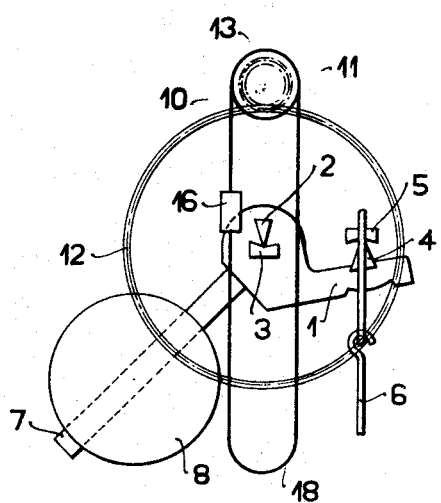
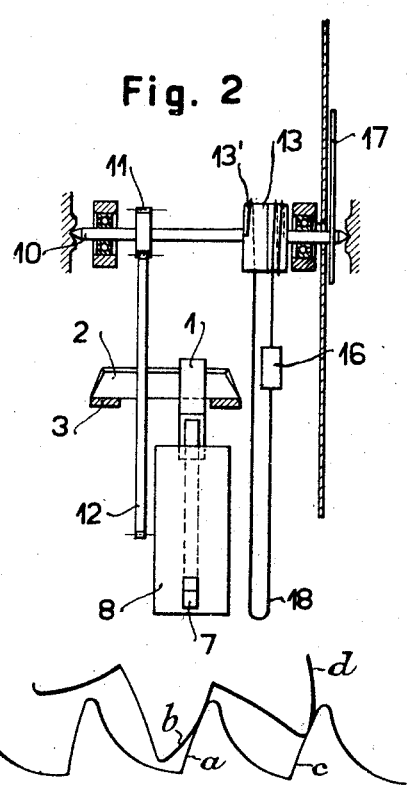

Patented June 28, 1932

1,864,831

UNITED STATES PATENT OFFICE

RUDOLF JOKSCH, OF VIENNA, AUSTRIA

WEIGHING APPARATUS WITH A LOAD BALANCING LEVER

Application filed April 23, 1928, Serial No. 272,176, and in Austria May 23, 1927.

My invention relates to weighing scales of the type in which a load balancing pendulum is provided, the movement of which is transmitted to the indicator shaft by means of toothed wheel gearing, and has for its object to obtain the highest degree of sensitiveness and precision to enable weighing scales of this type to be used in retail business both for comparatively large weights and also for goods of small weight, where the prescribed precision and senitiveness are very high.

Gearings are old in which a certain amount of backlash exists between the teeth and in which, to eliminate such lost motion, the teeth are pressed against each other by some torque acting on one of the toothed wheels.

In accordance with the present invention, a weighing scale of the type above referred to is provided, for the purpose of pressing the teeth of the gearing against each other in such a manner as to prevent backlash, with a weight suspended by flexible means from the indicator shaft. In the preferred construction, the flexible suspension means such as a cable, chain, thread or the like, which carries the weight in its middle portion is secured to said shaft with both ends and in such a manner that one of said ends is wound up while the other is being unwound. The length of the loop carrying said weight will thus always be the same, and the variation of the torque due to the varying length of the suspension means, which would otherwise manifest itself, will therefore be entirely eliminated.

In weighing scales of the type mentioned, in which the movement of the pendulum is directly transmitted by a pair of toothed wheels to the indicator, this small weight will, if a large amount of play is introduced between said pair of wheels, eliminate the inaccuracy due to such play, as the friction is reduced to a minimum, partly by said play and partly by the elimination of all intermediate parts. This facilitates the adjustment and increases the sensitiveness of the scale to a marked degree.

It is to be understood that this small weight also reacts upon the counterbalancing of the pan, owing to the high sensitiveness of the weighing scale and, therefore, must be considered as a part of the counterbalancing weight, which is thus distributed among two shafts. Such distribution is, however, not necessarily an even distribution, and moreover, the resulting load balancing weight may be obtained either by addition or by subtraction of the torques produced by the two weights.

An embodiment of the invention is diagrammatically shown by way of illustration in the accompanying drawing, in which Fig. 1 shows the most important parts of a scale according to the invention in elevation, Fig. 2 a side view of the same parts, and Fig. 3 an example for outline of the teeth of the gear wheels.

The weighing lever 1 is supported by the knife-edge 2 on the bearing 3 fixed to the frame of the weighing apparatus and which itself has a knife-edge 4 acting on the bearing 5 which is supported by the load carrying rod 6. The weighing lever 1 is joined to the load balancing lever 7 carrying the balancing load or counter weight 8. The knife-edge 2 is connected with a toothed wheel 12 engaging with a smaller wheel 11, which is fastened to the pointer shaft 10. This shaft carries the pointer 17 and furthermore, a small drum 13 for winding up the rope, chain or cord 18, from which the small counterweight 16 is suspended. The weights 16 and 8 constituting together the counterweight for the load which acts on rod 6 are so arranged as to hold the toothed wheels 11 and 12 pressed against each other in the same sense of rotation, whereby any play between the teeth of these wheels is completely eliminated. The drum 13 being cylindrical, the torque produced by it is constant which torque may be added to or deducted from the torque produced by the load balancing lever 7 and counterweight 8. For eliminating the effect produced by the weight of the rope or chain 18, the two ends thereof are secured respectively to the drum 13 and drum 13' both mounted on shaft 10, so that as one end of the rope is wound up, the other is unwound. The sagging portion of the rope therefore remains unchanged and consequently its weight remains constant.

Preferably, an armour steel consisting of interlocked rigid elements is used, as their weight per length unit is always constant and they have remarkably high strength.

In order to obtain a perfectly smooth frictionless rotary movement of the toothed wheels, teeth of special shape are preferably used. Since the wheels engaging with each other are constantly subjected to a certain load acting always in the same direction, their teeth are so shaped that the flanks of the teeth are always in contact, whilst their backs are cut out, so that during the movement of the gear no frictional contact takes place, the only contact being that along the contact lines between the meshing teeth, friction at the back of these teeth being completely eliminated. Fig. 3 shows a gearing designed according to this principle, the co-operating flanks $a, b$ and $c, d$ coming in contact with each other, whilst the back faces are shaped in such a manner, that they do not come into contact at all. The direction of rotation does not affect the engagement of the teeth, since these are continually kept in engagement by the two weights pressing them against each other in one direction only, that is to say, in such a manner that only those tooth surfaces which are intended for contact with each other are pressed against each other. Therefore, there is no positive intermeshing of the toothed wheels as in gears generally used, but a very large amount of play, which play, however, is eliminated because both toothed wheels are under the action of a torque. The friction between the toothed wheels when they are operated is thereby materially reduced, as friction cannot occur at more than three lines of contact the most, (provided that three teeth will simultaneously engage) and at two lines of contact only in general, the teeth being of such a size relative to the wheels that only two teeth are able to come into contact simultaneously. This is very important as the sensitiveness of the scale is thus not reduced by the use of toothed wheels.

What I claim is:—

1. In a weighing scale having a load balancing pendulum, an indicator shaft adapted to be rotated by said pendulum and a toothed wheel gearing intermediate said indicator shaft and said pendulum, means to uniformly press the engaging teeth of the toothed wheels against each other constantly in one direction, said means comprising a weight suspended by a flexible means from said indicator shaft.

2. In a weighing scale having a load balancing pendulum, an indicator shaft adapted to be rotated by said pendulum and a toothed wheel gearing intermediate said pendulum and said indicator shaft, the toothed wheels being so constructed and arranged as to have an amount of play between their engaging teeth preventing contact of their back sides during rotation in one direction, and means for maintaining the front sides of the teeth always in contact in one direction during rotation in either direction, said means continually and uniformly pressing said front sides against each other and comprising a weight suspended by a flexible means from said indicator shaft.

3. In a weighing scale having a load balancing pendulum, an indicator shaft adapted to be rotated by said pendulum, a toothed wheel gearing for transmitting said movement, a suspended weight on said indicator shaft, the suspension means of said weight being attached to said indicator shaft with both ends and said weight acting upon the engaging teeth of said transmission gearing so as to uniformly and constantly press the teeth of said gearing against each other during rotation in one direction.

4. In a weighing scale having a load balancing pendulum, an indicator shaft and a toothed wheel gearing intermediate said gearing and said pendulum, the teeth of said toothed gearing being capable of engagement in one direction only and arranged to be out of mutual contact at their back sides, a means to uniformly and continually press said teeth against each other in one direction only, said means comprising a weight suspended from said indicator shaft, and a suspension means for said weight attached with both ends to said indicator shaft in reverse direction, so as to be simultaneously wound and unwound therefrom to thereby maintain the weight suspended from said indicator shaft at a constant value.

5. In a weighing scale as specified in claim 4 two winding drums of equal shape mounted on said indicator shaft, each drum carrying one end of said suspension means forming a loop, said suspension means being so attached to said drums that one of said drums will unwind while the other will wind up said suspension means.

6. In a weighing scale as specified in claim 4, in which said suspension means forms a loop of permanent length between the two points of attachments on said indicator shaft, said length being so chosen, that the weight will only move within one half of said loop during the entire possible rotation of said indicator shaft.

In testimony whereof I have hereunto set my hand.

RUDOLF JOKSCH.